United States Patent [19]

Ahluwalia

[11] Patent Number: 5,466,100
[45] Date of Patent: Nov. 14, 1995

[54] MULTI-STEPPED POWER DRILL BIT HAVING HANDLE CHUCK ADAPTOR

[75] Inventor: Diljit S. Ahluwalia, Chicago, Ill.

[73] Assignee: Alfa Manufacturing Industries, Inc., Skokie, Ill.

[21] Appl. No.: 328,043

[22] Filed: Oct. 24, 1994

[51] Int. Cl.⁶ .................................................... B23B 51/02
[52] U.S. Cl. ............................................ 408/224; 408/226
[58] Field of Search ............................. 408/224, 225, 408/226, 240; 279/75

[56] References Cited

U.S. PATENT DOCUMENTS

| | | | |
|---|---|---|---|
| 3,758,222 | 9/1973 | Oakes | 408/224 |
| 4,184,692 | 1/1980 | Benson et al. | 408/226 |
| 4,582,458 | 4/1986 | Korb et al. | 408/224 |
| 4,692,073 | 9/1987 | Martindell | 279/75 |
| 4,858,939 | 8/1989 | Riggs | 279/75 |
| 5,013,194 | 5/1991 | Wienhold | 408/240 |

*Primary Examiner*—Daniel W. Howell
*Attorney, Agent, or Firm*—Dorn, McEachran, Jambor & Keating; Vangelis Economou

[57] ABSTRACT

A power drill bit having a stepped construction, referred to as a cone drill, and a quick change capability provided by a shank having a non-circular cross-section and a circumferential groove for quick connect-disconnect in a power tool or drill. The preferred embodiment includes a hexagonal shank which is at least one-half of the axial length of the drill bit in order to provide a better engagement to the power chuck.

3 Claims, 1 Drawing Sheet

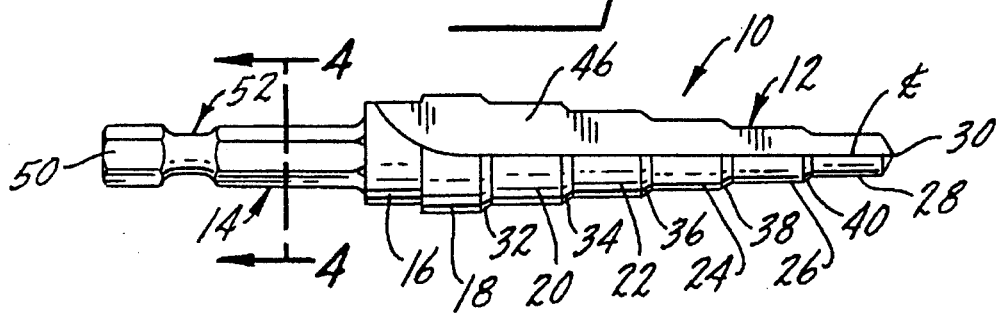
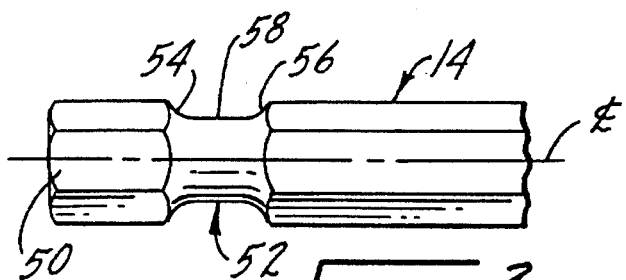
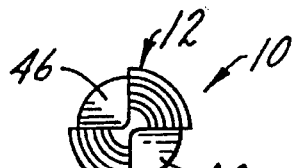
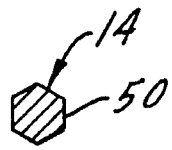
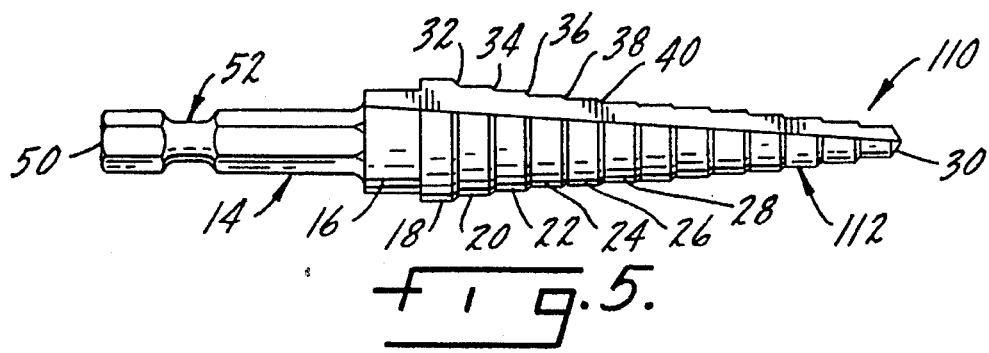

MULTI-STEPPED POWER DRILL BIT HAVING HANDLE CHUCK ADAPTOR

BACKGROUND OF THE INVENTION

1. Field of the Invention

This invention relates to drill bits and power bits having a stepped, cylindrical coaxial construction for drilling holes of different diameters and more particularly to drill bits having a shank which provides for quick release securing of the bit to the chuck of a handle.

2. Background Art

Drill bits of a stepped construction have been used for providing holes of different sizes. The diameter hole desired depends on the depth of penetration of the drill bit into the material. For example, Oakes U.S. Pat. No. 3,758,222 and Korb et al. U.S. Pat. No. 4,582,458 each disclose drill bits having coaxial cylindrical surfaces with bevelled portions which extend between the cylindrical surfaces helically to provide axial clearance for the drill. At least one flute extends axially along the length of the cutting portion of the drill bit for providing a cutting surface.

Known disclosures of such drill bits have been mainly for use in fixed or portable drills. These drill bits usually have a shank that is cylindrical or cylindrical with up to three flats, the flats being spaced apart equally in order to prevent slippage. Such shanks are appropriate for use in a standard chuck to use with these drills. The chuck is tightened around the shank to hold the drill bit within the tool during use and the shank helps avoid slippage.

The connection into and tightening of the chuck around the drill bit shank is an unnecessarily time-consuming procedure and is occasionally prone to accidental misalignment of the drill bit from the axis of rotation of the drill chuck. This may result in further lost time in untightening the chuck, realigning the drill bit and retightening the chuck. Furthermore, if the misaligned drill bit is used in drilling, the workpiece may be damaged or the drill bit may break, which may result in serious injury to the operator.

More recently, hand tools and power tools have been manufactured utilizing a quick-change capability allowing swift, efficient and essentially error-proof insertion of tool bits without misalignment. For example, screwdriver tips or hexagonal bolt tips having a construction generally able to be quickly changed are known. Other tools have been used for quick change which are known in the industry as power bits. The term "power bit" refers to elements typically used for driving fastener devices such as screws, nuts, and bolts. To facilitate the quick change of these types of bits within power tools, such as hand held power tools that are driven by electric or air driven tools, various quick change devices have been utilized. For example, one type of a quick release device having a quick change capability is found in U.S. Pat. No. 4,184,692. This patent describes a quick release chuck similar in principle to most quick release chucks of power tools in present use. The American National Standards Institute has provided a specification for quick change tools, known as ANSI B107.4-1973, to standardize the shape, dimensions and other features of the shank of the tool bits to provide easy interchangeability of tool bits.

The known use of quick change devices in present use requires that the chuck for which these tools are intended for use have a specific construction. An example of such construction is taught by U.S. Pat. No. 4,692,073. The specific chuck construction is not of overriding importance to this discussion other than as an explanation of the use of the inventive drill bits within the context of hand held power tools.

What is not shown in the prior art and what is necessary for providing a quick change ability to drill bits of the conical shaped drill bits.

SUMMARY OF THE INVENTION

The invention herein described and claimed is a multi-purpose drill bit having a capability of a quick change within a chuck for a power bit use, which further eliminates the requirement for adjustment to hold the tool.

Additional advantages derive from the capability provided by the present invention to ascertain the axial position of the multi-purpose drill bit relative to the rotating chuck and to maintain that position invariably. This capability ensures that the drill height or distance from the workpiece is constant during repeated use for drilling identical workpieces. This capability is especially useful in automated drilling operations where the drill can be programmed to penetrate the workpiece to the proper depth in order to provide a hole drilled to the required diameter.

Accordingly, there is provided a power drill bit of stepped construction having a shank at one end and a series of generally cylindrical outer surfaces of incrementally decreasing diameter from the shank end to a tip end, the power drill bit comprising a beveled conical surface interconnecting each adjacent pair of cylindrical surfaces, at least one flute, each of the flutes having at least one essentially radially and axially extending surface, each one of the flutes being machined into the drill bit to provide at least one cutting edge for each diameter defined by the intersection of said one surface of each of said flutes, each of said cylindrical surfaces and each of said conical surfaces, and said shank having a non-circular cross-section and a groove extending circumferentially about the shank, said groove including an essentially flat center portion and at least one radius portion intersecting the non-cylindrical surface of said shank.

In a preferred embodiment, two flutes are machined in opposite sides of the power bit and the relative lengths of the shank portion to the drill portion is about one to two, respectively.

BRIEF DESCRIPTION OF THE DRAWINGS

FIG. 1 is an elevational front view of the drill bit according to the present invention.

FIG. 2 illustrates a side view of the power bit according to this invention as seen from the drill bit end of FIG. 1.

FIG. 3 is a detailed view of the shank portion of the power bit shown in FIG. 1.

FIG. 4 is a cross-sectional view of the shank taken approximately along the lines 4—4 of FIG. 1.

FIG. 5 is a plan view of an alternative embodiment according to the present invention.

DETAILED DESCRIPTION OF THE PREFERRED EMBODIMENT

FIG. 1 is an elevational front view of the power bit according to this invention. The power bit 10 includes a drill bit portion 12 and a shank portion 14. These elements may be integrally connected to each other to ensure that rotation of the shank 14 will result in simultaneous rotation of the power drill bit portion 12.

Referring now to both FIGS. 1 and 2, the drill bit portion 12 comprises a base 16 and a plurality of axially spaced essentially cylindrical surfaces 18, 20, 22, 24, 26, and 28. For convenience, these cylindrical surfaces are sometimes referred to as steps. The base 16 provides a connecting bridge between the shank portion 14 and the drill bit portion 12. The shank portion 14 is either integral or integrally joined to the base 16 by welding or other essentially permanent means in the preferred construction of the power bit 10.

The drill bit portion comprises a plurality of cylindrical surfaces 18, 20, 22, 24, 26, 28 having a progressively decreasing diameter, with largest diameter being at the base portion 16 and the smallest being at the tip end 30. Conical transition surfaces 32, 34, 36, 38 and 40 are provided between pairs of adjacent stages of the cylindrical surfaces 18, 20, 22, 24, 26 and 28, respectively. The power bit 10 also has at least one axially extending flute 46 and preferably has a second axially extending flute 48 as shown in FIG. 2.

The shank portion 14 may comprise a hexagonal shank having axially extending surfaces 50 and radially inwardly extending circumferential groove 52. The groove 52 is of a predetermined width and of a predetermined depth, preferably in accordance with the ANSI standards described above. The groove 52 includes a pair of radius portions 54,56 and a bottom flat 58 between the radius portions 54,56 which are best seen in FIG. 3.

The shank portion 14 must have a sufficient axial length for engagement into a number of tools, such as a power chuck adaptor or a standard cordless screwdriver. A length of the shank portion 14 at least one-half the length of the drill bit portion 12 is considered adequate, and a ratio of about 1 to 2 is considered preferable. The longer axial length of the shank portion 14 enables the power bit 10 to remain true in rotation about the longitudinal axis, labelled CL in FIGS. 1 and 3. A hexagonally shaped shank portion 14, as shown in cross-section by FIG. 4, is thus preferable for use in a power bit, to provide a better engagement of the power chuck to the shank portion 14.

The axial length of the circumferential groove 52 is dictated by the ANSI standards and will enable an operator to accurately position and retain the tool within a power chuck to high enough tolerances thereby enabling precise formation of a hole in a workpiece. The precise axial disposition of the circumferential groove 52 relative to the axial positions of the various cylindrical surfaces 18, 20, 22, 24, 26 and 28 allows the bit to provide a hole having a desired diameter strictly as a function of the depth of penetration of the workpiece by the drill portion 12 of the power bit 10.

The precise relationship of axial distance from the groove to the hole diameter gives rise to several advantages which are useful to most drilling operations but most efficiently suited to take advantage of the increasing trend toward automated and programmed operations. The efficacy of a multi-stepped drill bit has been understood since the introduction of such drill bits. One drill bit may be used to drill holes of different diameters without necessitating the change of drill bits and wasting valuable time.

By using a power bit 10 according to the present invention, however, the depth of penetration into a workpiece can be now correlated to the hole size and the precise axial movement of the drilling tool. In an automated operation, for example, holes of different sizes may be made simply by programming the drill to move axially a shorter or longer distance, depending on the hole diameter desired. The programming instructions themselves may be standardized, thus further gaining a savings in programming time.

Use of the present invention may enable an operator to drill all of the holes on a workpiece by using a single power bit, where before each drill bit could only be used to drill a hole of one size, requiring several bit changes during the operation if holes of different diameter were desired. Conversely, if a known multi-step drill having a conventional shank portion were used, the operation would have to be carried out manually to ensure that the operator would stop penetration of the drill bit into the workpiece at the right depth. This last procedure is prone to errors because the manual operation requires counting the number of cylindrical surfaces which have penetrated.

Although not generally a problem with six such cylindrical surfaces, as shown in FIG. 1, when a greater number of steps, such as the thirteen steps shown in U.S. Pat. No. 3,758,222 issued to Oakes. As shown in the alternative embodiment 110 in FIG. 5, ability to provide a greater number of steps on a multi-stepped power bit is further enhanced by the precise positioning of the circumferential groove 52 relative to the steps 18, 20, 22, 24, 26 and 28. The definite and precise relationship permits cylindrical surfaces to have much shorter axial lengths, on the order of one-eighth inch (⅛") or less. Thus, a greater number of hole diameters, in excess of ten and even more, may be accommodated by a single power bit. A thirteen step power bit 112 made according to the present invention is shown for clarity, wherein the drawing FIG. 5, wherein like elements are identified by identical reference numerals as in the embodiment of FIG. 1.

Preferred embodiments of the invention are described and one is shown in the illustrated drawing to illustrate the underlying principles of the invention. It is to be understood that various modifications and adaptations may be made thereto without departing from the broad spirit and scope of the invention which is only limited by the following claims and equivalents thereof.

What is claimed is:

1. A power drill bit of stepped construction having a shank at one end and a series of at least ten generally cylindrical outer surfaces of incrementally decreasing diameter from the shank end to a tip end, each of said at least ten cylindrical surfaces have an axial length of one-eighth inch or less, said power drill bit comprising a beveled conical surface interconnecting each adjacent pair of cylindrical surfaces, at least one flute, each said at least one flute having at least one essentially radially and axially extending surface, said at least one flute being machined longitudinally into sides of the drill bit to provide at least one cutting edge for each diameter defined by the intersection of said one surface of each of said at least one flute, each of said cylindrical surfaces and each of said conical surfaces, and said shank having a non-circular cross-section and a groove extending circumferentially about the shank, said groove including an essentially flat center portion and at least one radius portion intersecting the non-cylindrical surface of said shank.

2. A power drill bit of stepped construction having a shank at one end and a series of generally cylindrical outer surfaces of incrementally decreasing diameter from the shank end to a tip end, said power drill bit comprising a beveled conical surface interconnecting each adjacent pair of cylindrical surfaces, at least one flute, each said at least one flute having at least one essentially radially and axially extending surface, said at least one flute being machined longitudinally into sides of the drill bit to provide at least one cutting edge for each diameter defined by the intersection of said one surface of each of said at least one flute, each of said cylindrical surfaces and each of said conical surfaces, and said shank having a non-circular cross-section and a groove extending circumferentially about the shank, said groove including an essentially flat center portion and at least one radius portion intersecting the non-cylindrical surface of said shank wherein the length of said shank portion relative to that of said drill portion is in a relative ratio of at least 1 to 2.

3. The power bit according to claim 2 wherein said ratio is about 1 to 2.

* * * * *